UNITED STATES PATENT OFFICE 2,375,145

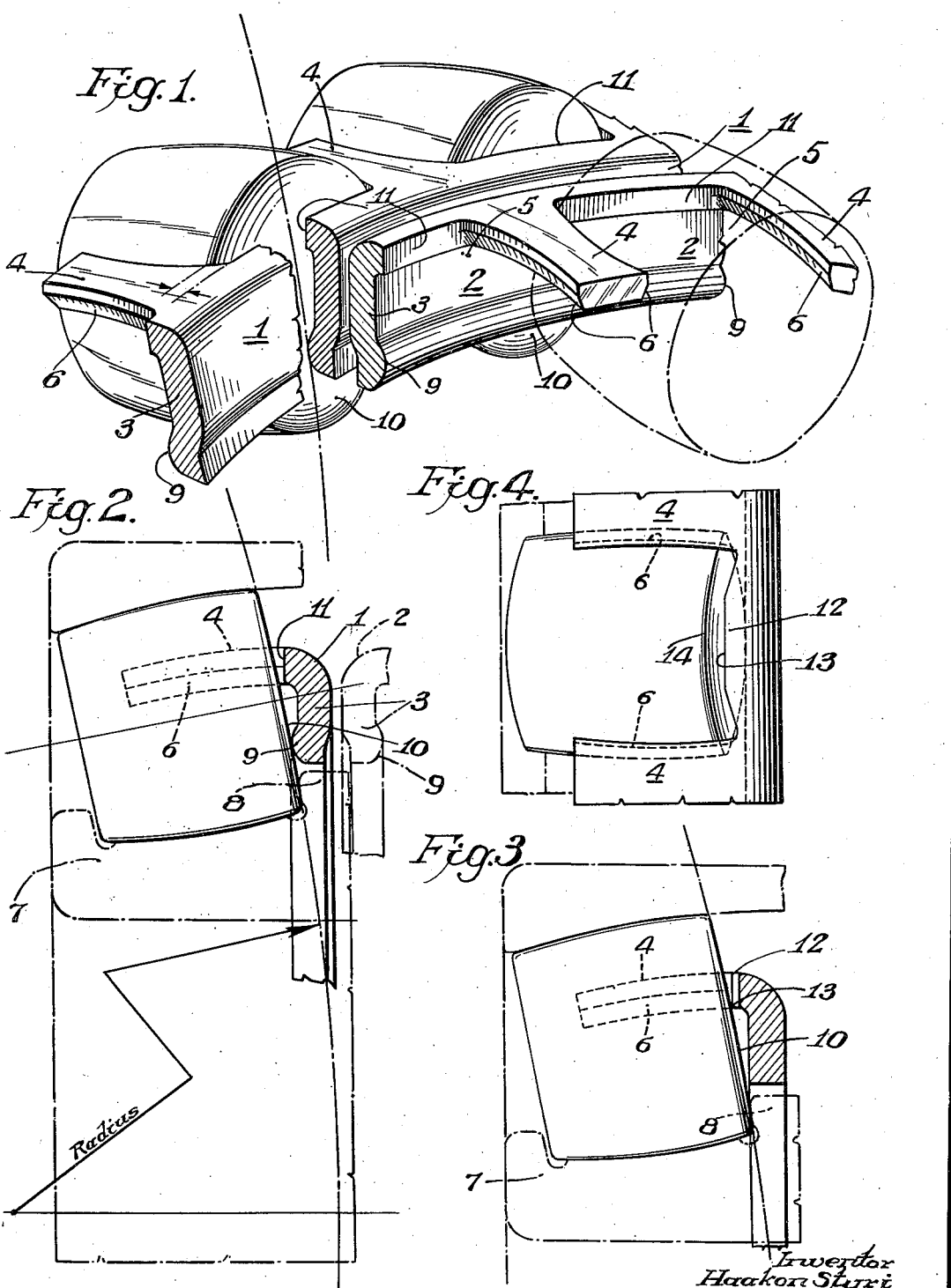

CAGE FOR ROLLER BEARINGS

Haakon Styri, Philadelphia, Pa.

Application January 13, 1943, Serial No. 472,238

13 Claims. (Cl. 308—218)

This invention relates to cages for spherical or taper roller bearings, and more particularly to bearings of the double-row type.

In this type of bearing, the form and location of the cage are of primary importance. Cages positioned and guided in part by the rollers and in part by the inner race of the bearing have afforded satisfactory results, but such cages are not well adapted to mass production because proper fit requires accuracy in so many different dimensions. Other proposed forms of cage, designed to simplify and reduce the cost of manufacture, have been only partially successful because of functional difficulties arising in part from the form of the cage and in part from inability to maintain the cage in proper position with respect to the rollers. In general, and patricularly in the spherical roller bearings, the cages conventionally and most successfully used have been those of the first-mentioned relatively expensive type.

A principal object of this invention is to provide a functionally efficient cage of relatively simple form for bearings of the stated class, said cage being highly adaptable to manufacture by mass production methods and meeting in full degree the requirement for a cage of these characteristics.

With this end in view, another object of the invention is to provide a cage which shall be supported and effectively guided solely by the rollers themselves, and in a manner to reduce to a minimum the factor of wear and metallic seizure on both the cage and the rollers.

Still more specifically, an object of the invention is to provide an improved cage for double-row bearings of the stated class which shall consist of two pieces arranged back to back between the said rows, with means for interlocking the two pieces with the rollers of the respective rows and through the rollers with the inner roller race so as to maintain the said pieces in stable position with suitable clearances between the cage and the bearing races and also between the said cage pieces; and wherein provision is made for avoiding contact between the peripheral end edges of the rollers and inside corners of the cages, all as hereinafter specifically described:

In the attached drawings:

Fig. 1 is a view in perspective of a section of a two-piece cage for spherical roller bearings as made in accordance with my invention;

Fig. 2 is a fragmentary transverse sectional view showing the relationship between the rollers and the cage members, and between the said members and the races of the bearing, the said races being shown in broken lines;

Fig. 3 is a fragmentary sectional view similar to Fig. 2 illustrating a modification within the scope of the invention;

Fig. 4 is a plan view of the portion of the cage and roller assembly illustrated in Fig. 3;

Figure 7:
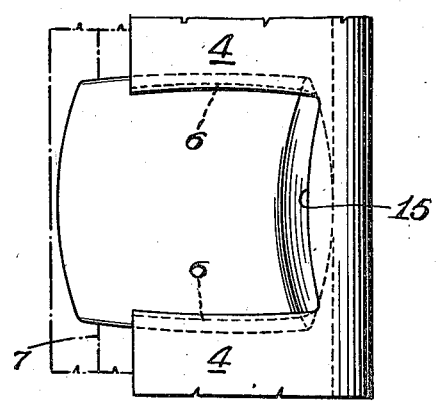
Fig. 7 is a plan view of the cage and roller assemblies shown in Fig. 5.

With reference to the drawings, the cage illustrated in Figs. 1 and 2 comprises two identical pieces adapted respectively for engagement with the rollers of the respective rows of a two-row roller bearing of the spherical type. Each of the pieces, which are designated by the reference numerals 1 and 2 respectively, has a substantially radial base ring 3, from the outer edge of which extends an annular series of transversely projecting arms 4, between which are formed pockets 5 for the individual rollers, as illustrated. The arms 4 converge toward the axis of the bearing, see Fig. 2, and are otherwise formed so as to conform to the roller faces, the inner longitudinal edges of the arms being swaged, as indicated at 6, so as to afford an extended surface contact with the said faces. The cage pieces gravitate axially toward the proximate ends of the rollers of the respective rows until they reach stable positions wherein they are, in effect, interlocked with the rollers, and through the rollers with the inner race, this race being shown in broken lines in Fig. 2 and indicated by the reference numeral 7. As shown, the inner peripheral edge of the base ring 3 of the cage is spaced radially from the central flange or land 8 of the inner race 7 which separates the races for the two sets of rollers, so that the rollers themselves constitute the sole support and guide for the cage. Desired freedom in radial and axial play for the cage can of course be obtained by suitable selection of dimensions.

By reason of the inclinations of the rollers and of the arms 4, the cage pieces, as previously stated, would move axially toward the respective supporting rollers. In the embodiment of the invention illustrated in Figs. 1 and 2, this movement is limited in each case by the pad-like offset lower edge portion 9 of the base ring 3, which by engagement with the end surface 10 of the rollers retains the cage piece axially in the position illustrated in Fig. 2. By this means, clearance is afforded between the end surfaces 10 of the rollers and the inner end walls 11 of the pockets 5, and more particularly between the peripheral edges of the said end surfaces and the filleted corners of the inner ends of the pockets. It is generally not practical to round off these edges with sufficiently large radii to avoid interference with the filleted corners. In the present instance, the end surfaces 10 of the rollers of each row are formed so as to describe different sections of a common sphere the center of which lies on the axis of the bearing, and since the inner offset edge portion 9 of the base ring 3 is an annulus also centering in the bearing axis, it is apparent that this edge portion will bear against the spherical end surface 10 continuously from one edge of the said surface to the other. By the means set forth, the positions of the cage pieces in the bearing, see Fig. 2, are fixed both axially and radially without direction guiding contact between the cage and either of the races.

Cage pieces of the form described are readily manufacturable from sheet metal, and it has been found that the cage pieces may be manufactured to the necessary fits by methods affording a substantial economy over the methods employed in the manufacture of the prior cages for this type of bearing. The roller pockets may be produced in a cup-shaped blank by a simple punching operation. The prongs may then be bent inwardly to the required angle with the axis of the bearing, and the swaging of the edges 6 effected by means of rollers pressed against the edges of the prongs from the inside. The forming of the offset 9 is a simple pressing operation. No careful machining is required for production of the cage to the required dimensional accuracy.

Figure 5:
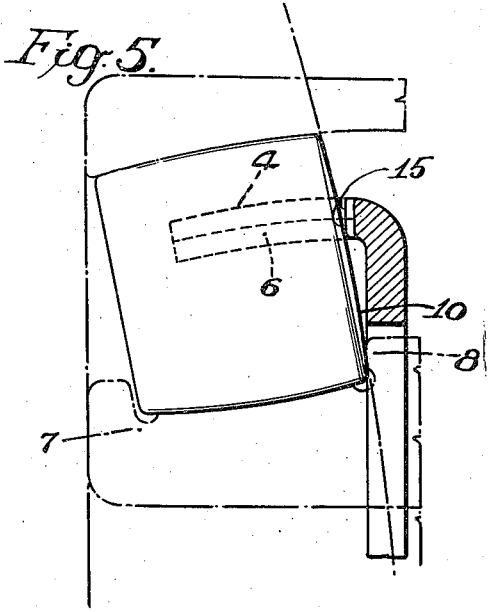

In the aforedescribed embodiment, the offset inner edge portion 9 of the cage pieces prevents contact between the inner corners of the pockets 5 and the end edges of the roller, this having been found essential in order to preclude undue wear of the said corners and roller edges. The effect may be obtained as illustrated in Figs. 3 and 4 by forming the inner end surfaces of the respective roller pockets 5 with a central projecting portion, as indicated at 12. Where the edges 13 of these projections describe separate segments of a common circle centering in the bearing axis, the edges will have contact throughout their individual lengths with the spherical ends of the rollers, and the peripheral edges 14 of the inner ends of the rollers will be prevented from engaging the corners of the pockets. Instead of the line contact provided by the construction shown in Fig. 4, the inner end wall of the pocket may be curved convexly, as indicated at 15 in Fig. 7, in which case the contact area is limited substantially to a point, see Fig. 5.

Figure 8:
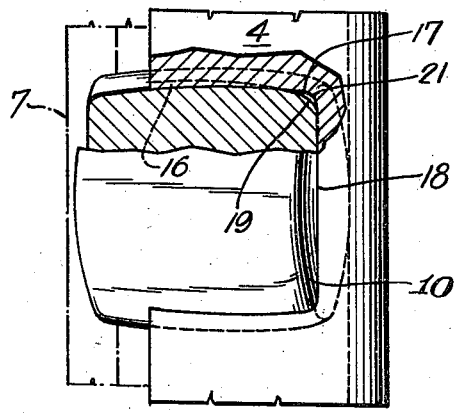
Fig. 8 is a like plan view of Fig. 6 but partly in section on the line 8—8 in the latter figure.
Figure 6:
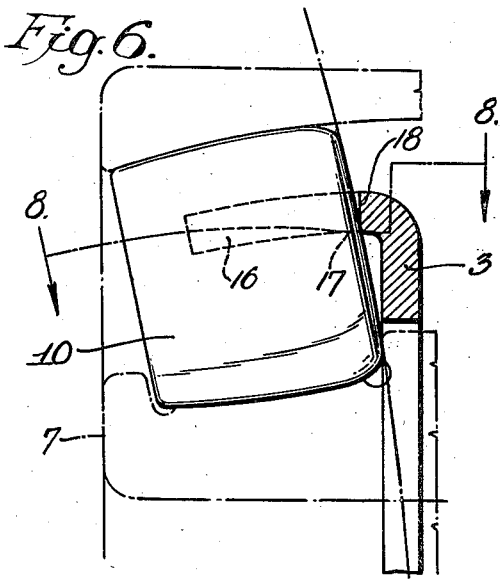
Figs. 5 and 6 are fragmentary sectional views of the character of Figs. 2 and 3 illustrating still further modifications within the scope of the invention.

The desired effect may be obtained also by means shown in Figs. 6 and 8, wherein the swaged surfaces of the inner edges of the prongs 4, designated in this instance by the reference numeral 16, is such that the swaged surface terminates short of the inner end of the prong and of the roller. The side surface of the roller will then be clear of the edge 17 of the prong which extends from the inner end of the swaged surface 16 to the inner end 18 of the pocket, and the rounded edge 19 of the roller can easily clear the fillets when the roller end has contacted the inner end edge of the pocket, as shown in Fig. 8.

I claim:

1. In a bearing of the class described including inner and outer race elements and rollers coacting with said races, a cage for said rollers comprising a substantially radial base ring and arms extending transversely from and in annular series to one side only of said ring and forming therebetween pockets for the rollers of a single row; said arms being arranged to engage the rollers assembled on the inner race of the bearing in positions on the rollers outwardly of the roller axes with reference to the axis of the bearing, and being shaped to fit the faces of the rollers; the outer ends of said arms converging toward said axis so that the arms may interlock and support the cage with and solely on the rollers; and means within the cage and co-active with the arms for maintaining the cage on the rollers in an axially and radially localized position wherein the corners at the inner ends of the pockets, where the arms join the base ring, are spaced from the peripheral edges of the proximate ends of the respective rollers.

2. In a cage for bearings of the class described, an annular structure comprising a substantially radial base ring and arms extending in a generally transverse direction from and in annular series to one side only of said ring and forming therebetween pockets for the rollers of a single row, said arms being shaped to fit the faces of the rollers and to interlock and to support the base ring with and solely on the rollers when assembled on a race ring of the bearing, and guide means on the base ring engageable with the end surfaces of the rollers and co-active with said arms to maintain the said structure on the rollers in an axially and radially localized position wherein the corners of the inner ends of said pockets where the arms join the base ring do not contact the peripheral edges of the proximate ends of the respective rollers.

3. In a cage for bearings of the class described, an annular structure comprising a substantially radial base ring and arms extending transversely from and in annular series to one side only of said ring and forming therebetween pockets for the rollers of a single row, said arms being formed to interlock and to support the base ring with and solely on the rollers and having longitudinal surfaces fitted to the faces of the rollers, the longitudinal edges of said surfaces converging toward the inner ends of the arms and intersecting at a terminal point on the latter spaced outwardly from the junctures of the arms with the base ring, and the edges of the inner ends of the rollers and the corners at the inner ends of the pockets being relatively formed so that when the ends of the rollers contact the inner end walls of the respective pockets the said edges are clear of the said corners.

4. In a cage for bearings of the class described, an annular structure comprising a substantially radial base ring and arms extending transversely from and in annular series to one side only of said ring and forming therebetween pockets for the rollers of a single row, said arms being shaped to fit the faces of the rollers and to interlock and to support the base ring with and solely on the rollers when assembled on the inner race ring of the bearing, in a stabilized position wherein the corners of the inner ends of said pockets where the arms join the base ring do not interfere with the peripheral edges of the proximate ends of the respective rollers.

5. In a cage for bearings of the class described, an annular structure comprising a substantially radial base ring and arms extending transversely from and in annular series to one side only of said ring and forming therebetween pockets for the rollers of a single row, said arms being shaped to fit the faces of the rollers and to interlock and to support the base ring with and solely on the rollers when assembled on a race ring of the bearing, and means on the base ring at the inner end of each of said pockets engageable with the proximate end surface of the pocketed roller and co-active with the arms to maintain the said structure in an axially and radially localized position on the rollers wherein the corners of the inner ends of said pockets where the arms join the base ring are spaced from the peripheral edges of the said proximate ends of the rollers.

6. In a cage for bearings of the class described, an annular structure comprising a substantially radial base ring and arms extending transversely from and in annular series to one side only of said ring and forming therebetween pockets for the rollers of a single row, said arms being shaped to fit the faces of the rollers and to interlock and to support the base ring with and solely on the rollers when assembled on the inner race ring, the inner end of each of the pockets being formed with a projection intermediate the sides of the pocket and toward the open end of the latter, said projection being engageable with the proximate end surface of the pocketed roller and co-acting with the arms to maintain the cage in an axially and radially localized position on the rollers wherein the corners of the inner ends of said pockets where the arms join the base ring do not contact the peripheral edges of the said proximate ends of the rollers.

7. In a cage for bearings of the class described, an annular structure comprising a substantially radial base ring and arms extending transversely in annular series from one peripheral edge of the ring and to one side only of said ring and forming therebetween pockets for the rollers of a single row, said arms being shaped to fit the faces of the rollers and to interlock and to support the base ring with and solely on the rollers when assembled on a race ring of the bearing, and means in the region of the other peripheral edge of the ring for engaging the proximate end surfaces of the rollers to maintain the said cage in an axially and radially localized position on the rollers wherein the corners of the inner ends of said pockets where the arms join the base ring do not frictionally engage the peripheral edge of the said proximate ends of the rollers.

8. In a cage for bearings of the class described, a pair of annular cage structures each comprising a substantially radial base ring and arms extending transversely from and in annular series to one side only of said ring and forming therebetween pockets for the rollers of a single row, said cage structures being adapted for arrangement independently between the rows of rollers, and said arms being shaped to fit the faces of the rollers and to interlock and to support the base rings with and solely on the assembled rollers of the respective rows, and means reactive with the rollers of the respective associated rows and co-active with the said arms for maintaining the said structures in individual axially and radially localized positions on the rollers of the respective rows relatively spaced with respect to each other and with the corners of the inner ends of said pockets where the arms join the base ring spaced from the peripheral edges of the proximate ends of the respective rollers.

9. In a cage for bearings of the class described, a pair of annular cage structures each comprising a substantially radial base ring and arms extending transversely and in annular series from the outer peripheral edge and to one side only of said ring and forming therebetween pockets for the rollers of a single row, said cage structures being adapted for assembly in non-contacting relation between the rows of rollers, and the said arms being shaped to fit the faces of the rollers and to interlock and to support the base ring with and solely on the rollers with the inner peripheral edges of said rings in spaced relation to the inner bearing race, and means in the structures and co-active with the arms for maintaining the said structures in axially and radially localized positions on the respective rows of rollers in relatively spaced relation and with the corners of the inner ends of said pockets where the arms join the base ring spaced from the peripheral edges of the proximate ends of the pocketed rollers.

10. In a cage for double row spherical roller bearings, an annular cage structure comprising a substantially radial base ring and arms extending transversely from and in annular series to one side only of said ring and forming therebetween pockets for the rollers of a single row, said arms being shaped to fit the curved faces of the rollers and to interlock and to support the base ring with and solely on the assembled rollers, and means in the structure and adapted for reaction with the rollers to maintain the structure in cooperation with the arms in an axially and radially localized position on the rollers wherein the corners of the inner ends of said pockets where the arms join the base ring are spaced from the peripheral edges of the proximate ends of the respective rollers.

11. In a bearing of the class described wherein the end surfaces of the rollers of a single row are adapted to describe portions of a common sphere, an annular cage structure comprising a substantially radial base ring and arms extending transversely from and in annular series to one side only of said row, said arms being shaped to fit the faces of the rollers and to interlock and to support the base ring with and solely on the rollers, and annular means on the base ring positioned for engagement with the said end surfaces of the rollers coactive with the arms to maintain said structure in an axially and radially localized position on the rollers wherein the corners of the inner ends of said pockets where the arms join the base ring do not touch the peripheral edges of the said proximate ends of the rollers.

12. In a bearing of the class described wherein the end surfaces of the rollers of a single row are adapted to describe portions of a common sphere, an annular cage structure comprising a substantially radial base ring and arms extending transversely from and in annular series to one side only of said ring and forming therebetween pockets for the rollers of said row, said arms being shaped to fit the faces of the rollers and to interlock and to support the base ring with and solely on the rollers when assembled on one of the race rings of the bearing, and guide means on the base ring positioned for engagement with the said end surfaces of the rollers and co-active with the arms to maintain the cage in an axially and radially localized position on the rollers wherein the corners of the inner ends of said pockets where the arms join the base ring do not touch the peripheral edges of the said ends of the rollers, the portions of said guide means which engage the several rollers describing separate arcs of a common circle.

13. In a cage for bearings of the class described, an annular structure comprising a substantially radial base ring and arms extending transversely from and in annular series to one side only of said ring and forming therebetween pockets for the rollers of a single row, said arms being shaped to fit the faces of the rollers and to interlock and to support the base ring with and solely on the rollers when assembled on one of the race rings of the bearing; the inner end edges of the pockets exhibiting a convexity affording contact of limited area between the said inner edges and mid portions of the proximate end surfaces of the pocketed rollers, said contact co-acting with the arms to maintain the said structure in an axially and radially localized position on the rollers wherein the corners at the inner ends of said pockets, where the arms join the base ring, do not interfere with the peripheral edges of the proximate ends of the respective rollers.

HAAKON STYRI.